United States Patent Office 3,672,905
Patented June 27, 1972

3,672,905
NOVEL DYES AND PHOTOGRAPHIC EMULSIONS
Roy A. Jeffreys and Susan M. Mellows, Harrow, England, assignors to Eastman Kodak Company, Rochester, N.Y.
No Drawing. Filed Nov. 2, 1970, Ser. No. 86,316
Int. Cl. G03c 1/08
U.S. Cl. 96—140          4 Claims

ABSTRACT OF THE DISCLOSURE

Novel methine dyes are provided in which one terminal carbon atom of the methine chain of the dye has two groups attached thereto, said groups being selected from a dialkylamino group, a diarylamino group, an alkylarylamino group, a morpholino group, a thiomorpholino group and a piperidino group; and, the other terminal atom of the methine chain of said dye is attached to a heterocyclic nucleus of the type used in methine dyes. The preparation of such dyes, and photographic emulsions containing them, are also provided herein.

---

This invention relates to novel methine dyes, to new photographic emulsions and elements containing these dyes, and to the preparation of these novel dyes and photographic materials.

It is one object of this invention to provide methine dyes derived from enamines.

Another object of this invention is to provide light-sensitive photographic silver halide emulsions containing dyes derived from enamines as spectral sensitizers therefor.

Still another object of this invention is to provide photographic elements comprising a support having thereon at least one emulsion layer containing a dye of the invention.

Another object of this invention is to provide means for preparing these dyes.

Other objects of this invention will be apparent from this disclosure and the appended claims.

In accordance with this invention, novel methine dyes are provided in which one terminal carbon atom of the methine chain of the dye has two groups attached thereto, said groups being selected from a dialkylamino group, a diarylamino group, an alkylarylamino group, a morpholino group, a thiomorpholino group and a piperidino group; and, the other terminal carbon atom of the methine chain of the dye is attached to a heterocyclic nucleus of the type used in methine dyes.

As used herein and in the appended claims, the term "methine dyes" is used broadly as inclusive of dyes having the amidinium-ion system and the amidic system (as described by Mees and James, The Theory of the Photographic Process, Third Edition, 1966, page 201 et seq.), and including cyanine and related dyes, such as hemicyanine dyes, merocyanine dyes, oxamine dyes and the like.

Methine dyes in accordance with this invention, which can be derived from 1-substituted amino-enamines, are excellent spectral sensitizers for light-sensitive photographic silver halide emulsions, with maximum sensitivity peaks generally in the range of about from 460 to 600 nm. Thus, these novel dyes typically sensitize in the blue to orange-red region of the spectrum. In general, the novel dyes of this invention cause only very low fog levels in both fresh and incubated emulsions, and the negative images produced with emulsions containing these dyes are clear and sharp, and of excellent contrast.

Particularly useful methine dyes of this invention include those represented by the following formulas:

I.

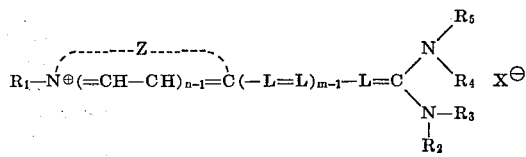

and

II.

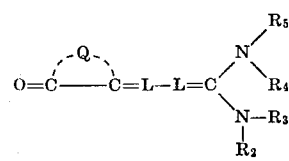

wherein $n$ and $m$ represent positive integers of from 1 to 2 and 1 to 3 respectively. L represents a methine linkage, e.g., =CH—, =C(CH$_3$)—, =C(C$_6$H$_5$)—, etc.; R$_1$ represents an alkyl group, including substituted alkyl, (preferably a lower alkyl containing from 1 to 4 carbon atoms), e.g., methyl, ethyl, propyl, isopropyl, butyl, hexyl, cyclohexyl, decyl, dodecyl, etc., and substituted alkyl groups (preferably a substituted lower alkyl containing from 1 to 4 carbon atoms), such as hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc.; a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylether, ω-ethoxycarbonylbutyl, etc., or an aralkyl group, e.g., benzyl, phenethyl, etc., or any aryl group, e.g., phenyl, tolyl, naphthyl, methoxyphenyl, chlorophenyl, etc.; R$_2$, R$_3$, R$_4$ and R$_5$ taken independently each represents an alkyl group, including substituted alkyl (preferably a lower alkyl containing from 1 to 4 carbon atoms) e.g., the alkyl groups referred to above, or an aryl group, such as those mentioned above; R$_2$ and R$_3$ taken together, and R$_4$ and R$_5$ taken together, represent in each instance the non-metallic atoms necessary to complete a member selected from the group consisting of a morpholino group, a thiomorpholino group and a piperidino group; X represents an acid anion, e.g., chloride, bromide, iodide, perchlorate, sulfamate, p-toluenesulfonate, methyl sulfate, etc., and may be part of R$_1$ when R$_1$ includes an acid group, such as a sulfoalkyl or a carboxyalkyl group, and the dye is in the form of its internal anhydride; Z represents the non-metallic atoms necessary to complete a 5- to 6-member heterocyclic nucleus of the type used in cyanine and hemicyanine dyes, which nucleus may contain a second hetero atom such as oxygen, sulfur, selenium or nitrogen, such as the following nuclei: a thiazole nucleus, e.g., thiazole, 4-methylthiazole, 4 - phenylthiazole, 5 - methylthiazole, 5-phenylthiazole, 4,5-dimethylthiazole, 4,5 - diphenylthiazole, 4-(2-thienyl)thiazole, benzothiazole, 4-chlorobenzothiazole, 5-chlorobenzothiazole, 6 - chlorobenzothiazole, 7-chlorobenzothiazole, 4-methylbenzothiazole, 5-methyl-benzothiazole, 6-methylbenzothiazole, 5 - bromobenzothiazole, 6-bromobenzothiazole, 5 - phenylbenzothiazole, 5 - phenylbenzothiazole, 4 - methoxybenzothiazole, 5-methoxybenzothiazole, 6 - methoxybenzothiazole, 5 - iodobenzothiazole, 6 - iodobenzothiazole, 4 - ethoxybenzothiazole, 5 - ethoxybenzothiazole, tetrahydrobenzothiazole, 5,6-dimethoxybenzothiazole, 5,6 - dioxymethylenebenzothiazole, 5 - hydroxybenzothiazole, 6 - hydroxybenzothiazole, naphtho[2,1-d]thiazole, naphtho[1,2-d]thiazole, 5 - methoxynaphtho[2,3 - d]thiazole, 5 - ethoxynaphtho-[2,3 - d]thiazole, 8 - methoxynaphthio[2,3 - d]thiazole, 7-methoxynaphtho[2,3-d]thiazole, 4' - methoxythianaphtheno - 7',6',4,5 - thiazole, etc.; an oxazole nucleus, e.g., 4 - methyloxazole, 5 - methyloxazole, 4 - phenyloxazole, 4,5-diphenyloxazole, 4 - ethyloxazole, 4,5 - dimethyloxazole, 5 - phenyloxazole, benzoxazole, 5 - chlorobenzoxazole, 5 - methylbenzoxazole, 5 - phenylbenzoxazole, 6 - methylbenzoxazole, 5,6 - dimethylbenzoxazole, 4,6-dimethylbenzoxazole, 5 - methoxybenzoxazole, 5 - ethoxybenzoxazole, 5 - chlorobenzoxazole, 6 - methoxybenzoxazole, 5 - hydroxybenzoxazole, 6 - hydroxybenzoxazole, naphtho[2,1 - d]oxazole, naptho[1,2 - d]oxazole, etc.; a selenazole nucleus, e.g., 4-methylselenazole, 4-phenylselenazole, benzoselenazole, 5 - chlorobenzoselenazole, 5 - methoxybenzoselenazole, 5 - hydroxybenzoselenazole, tetrahydrobenzoselenazole, naphtho[2,1 - d]selenazole, naphtho[1,2-d]selenazole, etc.; a thiazoline nucleus, e.g., thiazoline, 4-methylthiazoline, etc.; a pyridine nucleus, e.g., 2-pyridine, 5-methyl-2-pyridine, 4-pyridine, 3-methyl - 4 - pyridine, etc.; a quinoline nucleus, 2 - quinoline, 3-methyl - 2 - quinoline, 5 - ethyl - 2 - quinoline, 6-chloro-2-quinoline, 8 - chloro - 2 - quinoline, 6-methoxy-2-quinoline, 8 - ethoxy - 2 - quinoline, 8-hydroxy-2-quinoline, 4-quinoline, 6-methoxy-4-quinoline, 7-methyl-4-quinoline, 8-chloro-4-quinoline, 1-isoquinoline, 3,4-dihydro - 1 - isoquinoline, 3 - isoquinoline, etc.; a 3,3 - dialkylindolenine nucleus, e.g., 3,3 - dimethylindolenine, 3,3,5 - trimethylindolenine, etc.; and, an imidazole nucleus, e.g., imidazole, 1-alkylimidazole, 1-alkyl - 4 - phenylimidazole, 1 - alkyl-4,5-dimethylimidazole, benzimidazole, 1-alkylbenzimidazole, 1-aryl - 5,6 - dichlorobenzimidazole, 1-alkyl-1H-naphtho[1,2-d]imidazole, 1-aryl-3H-naphtho[1,2-d]imidazole, 1 - alkyl - 5 - methoxy - 1H - naphtho[1,2-d]imidazole, etc.; and the like nuclei; and Q represents the non-metallic atoms necessary to complete a 5- or 6-membered ketomethylene heterocyclic nucleus of the type used in merocyanine dyes, typically containing a hetero atom selected from nitrogen, sulfur, selenium, and oxygen, such as a 2-pyrazolin-5-one nucleus, e.g., 3-methyl-1-phenyl-2-pyrazolin-5-one, 1-phenyl, 2-pyrazolin - 5 - one, 1-(2-benzothiazolyl)-3-methyl-2-pyrazolin-5-one, etc.; an isoxazolone nucleus, e.g., 3 - phenyl - 5(4H) - isoxazolone, 3-methyl-5(4H)-isoxazolone, etc.; an oxindole nucleus, e.g., 1-alkyl-2-oxindoles, etc.; a 2,4,6 - triketohexahydro-pyrimidine nucleus, e.g., barbituric acid or 2-thiobarbituric acid as well as their 1-alkyl (e.g., 1-methyl, 1-ethyl, 1-propyl, 1-heptyl, etc.) or 1,3-dialkyl (e.g., 1,3-dimethyl, 1,3-diethyl, 1,3-dipropyl, 1,3 - diisopropyl, 1,3 - dicyclohexyl, 1,3(β-methoxyethyl), etc.); or 1,3-diaryl (e.g., 1,3-diphenyl, 1,3-di(p-chlorophenyl), 1,3-di(p-ethoxycarbonylphenyl), etc.; or 1-aryl (e.g., 1-phenyl, 1-p-chlorophenyl, 1-p-ethoxycarbonylphenyl, etc.) or 1-alkyl-3-aryl (e.g., 1-ethyl-3-phenyl, 1-n-heptyl-3-phenyl, etc.) derivatives; a rhodanine, nucleus (i.e., 2-thio-2,4-thiazolidinedione series), such as rhodanine, 3-alkylrhodanine, e.g., 3-ethylrhodanine, 3-allylrhodanine, etc., 3-carboxyalkylrhodanines, e.g., 3-(2-carboxyethyl)rhodanine, 3-(4-carboxybutyl)rhodanine, etc., 3-sulfoalkylrhodanines, e.g., 3-(2-sulfoethyl)rhodanine, 3-(3-sulfopropyl)rhodanine, 3-(4-sulfobutyl)rhodanine, etc., or 3 - arylrhodanines, e.g., 3-phenylrhodanine, etc., etc.; a 2(3H) - imidazo[1,2-a]pyridone nucleus; a 5,7-dioxo-6,7-dihydro-5-thiazolo[3,2-a]pyrimidine nucleus, e.g., 5,7 - dioxo-3-phenyl-6,7-dihydro-5-thiazolo[3,2-a]pyrimidine, etc.; a 2-thio-2,4-oxazolidinedione nucleus (i.e., those of the 2-thio-2,4(3H,5H)-oxazoledione series) e.g., 3-ethyl-2-thio-2,4-oxazolidinedione, 3-(2-sulfoethyl)-2-thio-2,4-oxazolidinedione, 3-(4-sulfobutyl)-2-thio-2,4-oxazolidinedione, 3 - (3 - carboxypropyl) - 2 - thio - 2,4 - oxazolidinedione, etc.; a thianaphthenone nucleus, e.g., 3-(2H)-thianaphthenone, etc.; a 2-thio-2,5-thiazolidinedione nucleus (i.e., the 2-thio-2,5-(3H,4H)-thiazoledione series), e.g., 3 - ethyl-2-thio-2,5-thiazolidinedione, etc.; a 2,4-thiazolidinedione nucleus, e.g., 2,4-thiazolidinedione, 3-ethyl-2,4-thiazolidinedione, 3-phenyl-2,4-thiazolidinedione, 3 - α - naphthyl - 2,4 - thiazolidinedione, etc.; a thiazolidinone nucleus, e.g., 4-thiazolidinone, 3-ethyl-4-thiazolidinone, 3-phenyl-4-thiazolidinone, 3-α-naphthyl-4-thiazolidinone, etc.; a 2-thiazolin-4-one nucleus, e.g., 2-ethylmercapto-2-thiazolin-4-one, 2-alkylphenylamino-2-thiazolin-4-one, 2-diphenylamino-2-thiazolin-4-one, etc.; a 2-imino - 4 - oxazolidinone (i.e., pseudohydantoin) nucleus; a 2,4-imidazolidinedione (hydantoin) nucleus, e.g., 2,4-imidazolidinedione, 3-ethyl-2,4-imidazolidinedione, 3-phenyl - 2,4-imidazolidinedione, 3-α-naphthyl-2,4-imidazolidinedione, 1,3-diethyl-2,4-imidazolidinedione, 1-ethyl-3-phenyl-2,4-imidazolidinedione, 1-ethyl-3-α-naphthyl-2,4-imidazolidinedione, 1,3-diphenyl-2,4-imidazolidinedione, etc.; a 2-thio-2,4-imidazolidinedione (i.e., 2-thiohydantoin) nucleus, e.g., 2-thio-2,4-imidazolidinedione, 3-ethyl-2-thio-2,4 - imidazolidinedione, 3 - (4-sulfobutyl)-2-thio-2,4-imidazolidinedione, 3 - (2-carboxyethyl)-2-thio-2,4-imidazolidinedione, 3 - phenyl - 2 - thio-2,4 - imidazolidinedione, 3-α-naphthyl-2-thio - 2,4 - imidazolidinedione, 1,3-diethyl-2-thio - 2,4 - imidazolidinedione, 1 - ethyl-3-phenyl-2-thio - 2,4 - imidazolidinedione, 1-ethyl-3-α-naphthyl - 2 - thio - 2,4 - imidazolidinedione, 1,3-diphenyl-2-thio-2,4-imidazolidinedione, etc.; a 2-imidazolin-5-one nucleus, e.g., 2-propylmercapto-2-imidazolin-5-one, etc.; etc. (especially useful are nuclei wherein Q represents the non-metallic atoms required to complete a heterocyclic nucleus containing five to six atoms in the heterocyclic ring, three to four of said atoms being carbon, and two of said atoms being selected from the group consisting of nitrogen, oxygen and sulfur, and at least one of said two atoms being a nitrogen atom).

Typical useful dyes of this invention include the following:

(1) 5-(3',3'-dipiperidinoallylidene)-3-ethoxycarbonylmethylrhodanine
(2) 2-(4-dimethylamino-4-diphenylaminobutadienyl)-3-ethylbenzothiazolium p-toluenesulfonate
(3) 2-(4-ethylphenylamino-4-methylphenylaminobutadienyl)-1-ethylquinolinium p-toluenesulfonate
(4) 5-(3',3'-dimorpholinoallylidene)-3-ethoxycarbonylmethylrhodanine
(5) 5-(3',3'-dithiomorpholinoallylidene)-3-ethoxycarbonylmethylrhodanine
(6) 2-(4,4-dipiperidinobutadienyl)-3-ethylbenzothiazolium iodide
(7) 2-(4,4-dimorpholinobutadienyl)-3-ethylbenzothiazolium iodide
(8) 2-(4,4-dithiomorpholinobutadienyl)-3-ethylbenzothiazolium chloride
(9) 5-(3',3'-dipiperidinoallylidene)-3-ethylrhodanine
(10) 5-(3',3'-dimorpholinoallylidene)-3-ethylrhodanine
(11) 5-(3',3'-dithiomorpholinoallylidene)-3-ethylrhodanine
(12) 5-(3'-dimethylamino-3'-diphenylaminoallylidene)-3-ethyl-rhodanine
(13) 2-(6,6-dipiperidinohexatrienyl)-3-ethylbenzothiazolium iodide Other related useful dyes include complex dyes such as represented by the following formulas:

III.

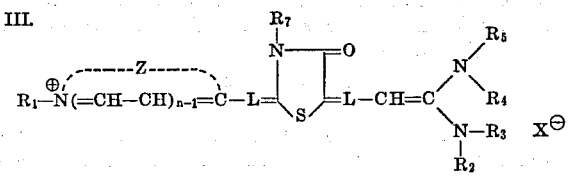

and

IV.

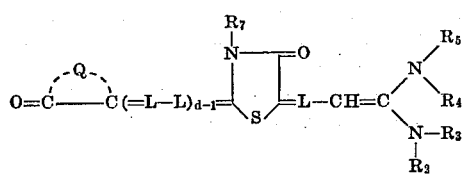

wherein $n$, $R_1$, $R_2$, $R_3$, $R_4$, $R_5$, $Z$, $L$, $X$ and $Q$ are as previously defined, $d$ represents a positive integer of from 1 to 2; and, $R_7$ represents a lower alkyl or an aryl group, e.g., methyl, butyl, etc., phenyl, tolyl, naphthyl, etc.

The novel methine dyes of this invention can be conveniently prepared in various ways. For example, the dyes defined by Formula I above are advantageously prepared by heating (preferably at reflux for about 20 to 30 minutes comprising (1) a heterocyclic salt of the formula:

V.

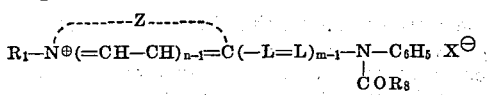

for dyes where $m$ is 2 or more, or of the formula

VI.

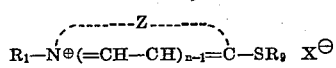

for dyes where $m$ is 1, with (2) an enamine of the formula:

VII.

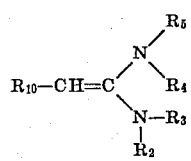

wherein $n$, $m$, $L$, $R_1$, $R_2$, $R_3$, $R_4$, $R_5$, $X$ and $Z$ are as previously defined, $R_9$ represents an alkyl or aryl group, e.g., methyl, ethyl, phenyl, etc., and $R_{10}$ represents hydrogen, alkyl or aryl groups, etc., in approximately equimolar proportions, in a solvent medium such as ethanol, preferably in the absence of basic condensation agents. The dyes are then separated from the reaction mixtures and purified by one or more recrystallizations from appropriate solvents such as ethanol.

For the preparation of the novel dyes of Formula II above, a mixture comprising (1) a ketomethylene heterocyclic compound of the formula:

VIII.

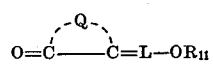

wherein $L$ and $Q$ are as previously defined, and $R_{11}$ represents an alkyl or aryl group, e.g., methyl, ethyl, phenyl, etc., and (2) an enamine of above Formula VII, in solvents such as chloroform, dioxan or ethanol, is allowable to react, e.g., at temperatures from 0° to refluxing temperature and the resulting dye is purified, in generally similar manner as described immediately above.

Another method for preparing a number of the novel methine dyes of Formula II above involves the use of the related immonium salts of the enamine derivatives of above Formula VII. For example, a ketomethylene heterocyclic compound of Formula VIII above or of the formula:

IX.

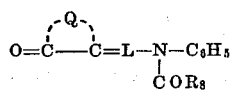

wherein $L$, $R_8$ and $Q$ are as previously defined, is condensed with (2) an immonium salt of the enamine of Formula VII, in approximately equimolar proportions in a solvent medium such as pyridine, and preferably in the presence of a basic condensation agent such as triethylamine. The resulting dye is isolated and purified by one or more recrystallizations from appropriate solvent such as ethanol/pyridine mixtures.

The novel complex methine dyes defined by Formulas III and IV above can be readily prepared from the methine dyes of Formula II above which contain a 2-thioxo substituent on the ketomethylene heterocyclic nucleus, such as for example a rhodanine nucleus, by alkylation with an alkyl ester followed by further condensation with an appropriate intermediate, for example, such as represented by Formulas X, XI and XII, in the presence of a base such as triethylamine.

X.

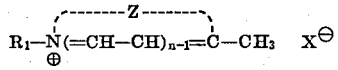

XI.

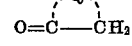

XII.

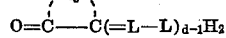

In the preparation of photographic emulsions, the new dyes of the invention are advantageously incorporated in the finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvent, in which the solvent selected should have no deleterious effect on the ultimate light-sensitive materials. Methanol, isopropanol, pyridine, etc., alone or in combination have proven satisfactory as solvents for the majority of our new dyes. The type of silver halide emulsions that are sensitized with our dyes include any of those prepared with hydrophilic colloids that are known to be satisfactory for dispersing light-sensitive silver halides, for example, emulsions prepared with hydrophilic colloids, such as, natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, and the like.

The concentration of our new dyes in the emulsion can be widely varied, i.e., generally from about 5 to about 100 mg. per liter of flowable emulsion. The specific concentration will vary according to the type of light-sensitive material in the emulsion and according to the effects desired. The most advantageous dye concentration for any given emulsion can be readily determined by making the tests and observations customarily used in the art of emulsion making. The dyes described herein can be used alone, in combination with each other or in combination with other spectral sensitizing dyes. The emulsions are coated to advantage on any of the support materials used for photographic elements, for example, paper, glass, cellulose acetate, cellulose acetate-propionate, cellulose nitrate, polystyrene, polyesters, polyamides, etc.

To prepare a gelatino-silver halide emulsion sensitized with one of the new dyes, the following procedure is satisfactory: A quantity of the dye is dissolved in a suitable solvent and a volume of this solution containing from 5 to 100 mg. of dye is slowly added to about 1000 cc. of a gelatino-silver halide emulsion. With most of the new dyes, 10 to 20 mg. of dye per liter of emulsion suffice to produce the maximum sensitizing effect with the ordinary gelatino-silver halides including silver chloride, bromide, bromoiodide, chlorobromide, chlorobromoiodide, etc. emulsions. With fine-grain emulsions, which include most of the ordinary employed gelatino-sliver chloride emulsions and the like, somewhat larger concentrations of dye may be necessary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

The above statements are only illustrative and are not to be understood as limiting the invention in any sense, as it will be apparent that the new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), and various gold compounds (e.g., potassium chloroaurate, auric trichloride, etc.) (see U.S. Pats. to W. D. Baldsiefen 2,540,085, granted Feb. 6, 1951; R. E. Damschroder 2,597,856, granted May 27, 1952, and H. C. Yutzy et al. 2,597,915, granted May 27, 1952), various palladium compounds, such as palladium chloride (W. D. Baldsiefen U.S. 2,540,086, granted Feb. 6, 1951), potassium chloropalladate (R. E. Stauffer et al. U.S. 2,598,079, granted May 27, 1952), etc., or mixture of such sensitizers; antifoggants, such as ammonium chloroplatinate (A. P. H. Trivelli et al. U.S. 2,566,245, granted Aug. 28, 1951), ammonium chloroplatinate (A. P. H. Trivelli et al. U.S. 2,566,263, granted Aug. 28, 1951), benzotriazole, nitrobenzimidazole, 5-nitroindazole, benzidine, mercaptans, etc. (see Mees, "The Theory of the Photographic Process," MacMillan Pub., 1942, p. 460), or mixtures thereof; hardeners, such as formaldehyde (A. Miller U.S. 1,763,533, granted June 10, 1930), chrome alum (U.S. 1,763,533), glyoxal (J. Brunken U.S. 1,870,354, granted Aug. 9, 1932, dibromacrolein (O. Block et al. British 406,750, accepted Mar. 8, 1934), etc.; color couplers, such as those described in I. F. Salminen et al. U.S. Pat. 2,423,730, granted July 7, 1947, Spence and Carroll U.S. Pat. 2,640,776, issued June 2, 1953, etc.; or mixtures of such addenda. Dispersing agents for color couplers, such as those set forth in U.S. patents to E. E. Jelley et al. 2,322,027, granted June 15, 1943, and L. D. Mannes et al. 2,304,940, granted Dec. 15, 1942, can also be employed in the above-described emulsions.

The following examples are included for a further understanding of this invention.

EXAMPLE 1

5-(3',3'-dipiperidinoallylidene)-3-ethoxycarbonylmethyl-rhodanine

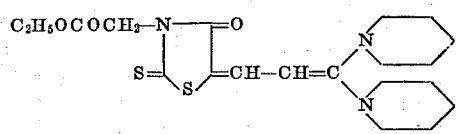

1,1-dipiperidinoethene (2 g.; .01 M) and 3-ethoxy-carbonylmethyl-5-ethoxymethylene rhodanine (2.8 g.; .01 M) in chloroform (20 ml.) are allowed to stand in the cold for 1 hour. Petroleum ether (2000 ml.) is added and the product collected and recrystallized from methanol as orange needles, M.P. 163° C., in 1.1 grams (29%) yield. Using generally similar procedures, as described above, related methine dyes 2 through 12 above can be prepared. The dye of the above example is tested in (1) a gelatin chlorobromide emulsion and (2) in a silver bromoiodide emulsion of the type described by Trivelli and Smith, Phot. Journal, 79, 330 (1939). The dye, dissolved in a suitable solvent, is added to separate portions of the emulsions at the concentrations indicated. After digestion at 50 degrees C. for 10 minutes, the emulsion is coated at a coverage of 432 mg. of silver/ft.$^2$ on a cellulose acetate film support. A sample of the coatings are exposed on an Eastman 1B Sensitometer and to a wedge spectrograph, processed for three minutes at 20° C. in a developer of the following composition:

DEVELOPER

|  | G. |
|---|---|
| N-methyl-p-aminophenol sulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |
| Water to make 1.0 liter. | | and then fixed, washed and dried. The sensitizing values obtained are shown in the following Table 1.

TABLE 1

| Dye 1 conc. (g./mole Ag.) | Type of silver halide emulsion | Sensitization Range (nm.) | Max. (nm.) | Estimation |
|---|---|---|---|---|
| 1.0 | Chlorobromide | To 630 | 560 | Excellent. |
| 1.0 | Bromoiodide | To 610 | 550 | Do. |

These results indicate that the dye of the preceding example is an excellent spectral sensitizer for light-sensitive silver halide emulsions. Generally similar results are obtained with dyes 2 through 12 above.

The following example illustrates the preparation of enamine intermediates that are employed in the invention.

EXAMPLE 2

1,1-di(piperidino)ethane

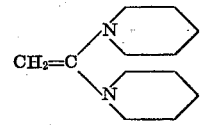

This compound is prepared according to H. Baganz and L. Domaschke, Ber., 95, 2095 (1962). The compounds 1,1-di(morpholino)ethane and 1,1-di(thiomorpholino)ethane can be prepared in like manner and substituted for 1,1-di(piperidono)ethane in the above examples to obtain useful methine dyes in accordance with this invention.

It will be apparent from all the foregoing, that still other of the methine dyes defined by Formulas I and II above can be readily prepared by appropriate selection of the intermediates referred to above, and that these dyes likewise will have similar excellent utility as spectral sensitizers for light-sensitive photographic silver halide emulsions of the negative type.

The invention has been described in detail with particular reference to preferred embodiments thereof, but, it will be understood that variations and modifications can be effected within the spirit and scope of the invention.

We claim:

1. A light-sensitive photographic silver halide emulsion containing a methine dye in which one terminal carbon atom of the methine chain of the dye has two groups attached thereto, said groups being selected from a dialkylamino group, a diarylamino group, an alkylarylamino group, a morpholino group, a thiomorpholino group and a piperidino group; and, the other terminal carbon atom of the methine chain of said dye is attached to a heterocyclic nucleus of the type used in methine dyes.

2. A light-sensitive photographic silver halide emulsion containing a methine dye selected from those represented by one of the following formulas:

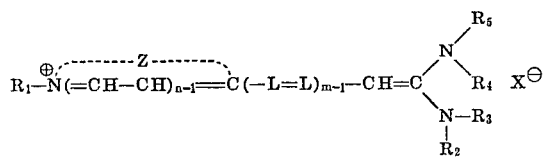

and

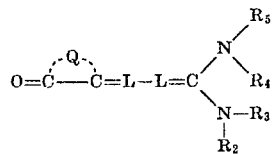

wherein $n$ represents an integer of from 1 to 2; $m$ represents an integer of from 1 to 3; each L represents a methine linkage; $R_1$ represents an alkyl group or an aryl group; $R_2$, $R_3$, $R_4$ and $R_5$ taken independently each represents an alkyl group or an aryl group; $R_2$ and $R_3$ taken together, and $R_4$ and $R_5$ taken together, represent in each instance the non-metallic atoms necessary to complete a member selected from the group consisting of a morpholino group, a thiomorpholino group and a piperidino group; X represents an acid anion; Z represents the non-metallic atoms necessary to complete a heterocyclic nucleus of the type used in cyanine dyes; and, Q represents the non-metallic atoms necessary to complete a 5- or 6-membered ketomethylene heterocyclic nucleus of the type used in merocyanine dyes.

3. A light-sensitive photographic silver halide emulsion containing a methine dye represented by the following formula:

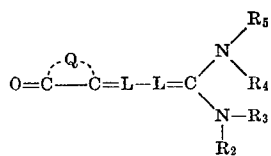

wherein each L represents a methine linkage; $R_2$, $R_3$, $R_4$ and $R_5$, taken independently, each represents an alkyl group or an aryl group; $R_2$ and $R_3$ taken together, and $R_4$ and $R_5$ taken together, represent in each instance the non-metallic atoms necessary to complete a member selected from the group consisting of a morpholino group, a thiomorpholino group and a piperidino group; and, Q represents the non-metallic atoms necessary to complete a 5- or 6-membered ketomethylene heterocyclic nucleus of the type used in merocyanine dyes.

4. A light-sensitive photographic silver halide emulsion in accordance with claim 3 wherein said $R_2$ and $R_3$ are taken together, and said $R_4$ and $R_5$ are taken together, and in each instance represent the non-metallic atoms necessary to complete a piperidino group.

References Cited
FOREIGN PATENTS

| | | |
|---|---|---|
| 1,148,493 | 4/1969 | England. |
| 1,092,253 | 11/1967 | England. |
| 1,092,252 | 11/1967 | England. |

NORMAN G. TORCHIN, Primary Examiner

J. L. GOODROW, Assistant Examiner

U.S. Cl. X.R.

96—127, 138